Jan. 2, 1968     L. J. BUDD     3,361,092
DECK PALLET AND METHOD OF MAKING SAME
Filed Oct. 5, 1965     5 Sheets-Sheet 2
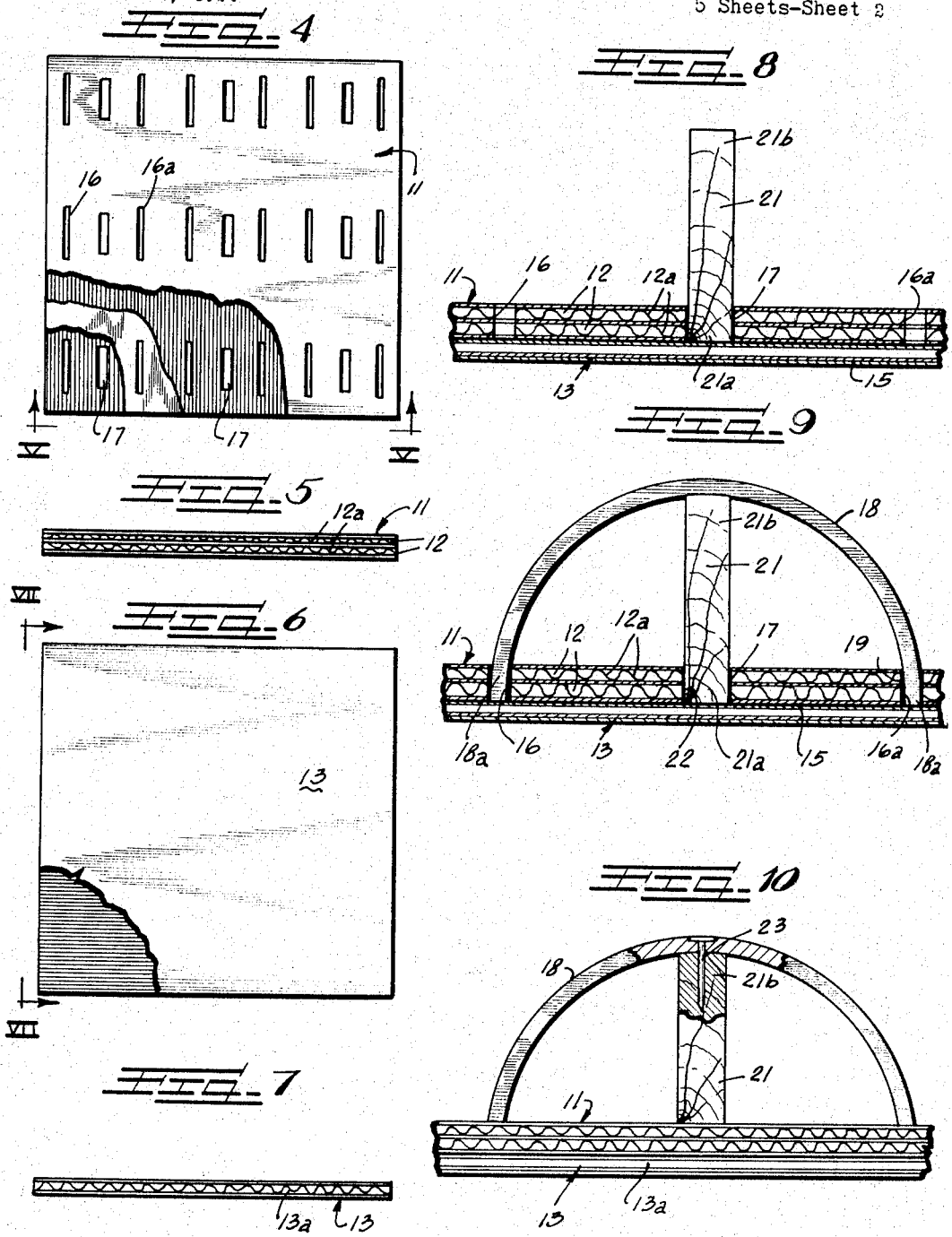
INVENTOR.
Larry J. Budd
BY     ATTORNEYS Jan. 2, 1968  L. J. BUDD  3,361,092
DECK PALLET AND METHOD OF MAKING SAME
Filed Oct. 5, 1965  5 Sheets-Sheet 3
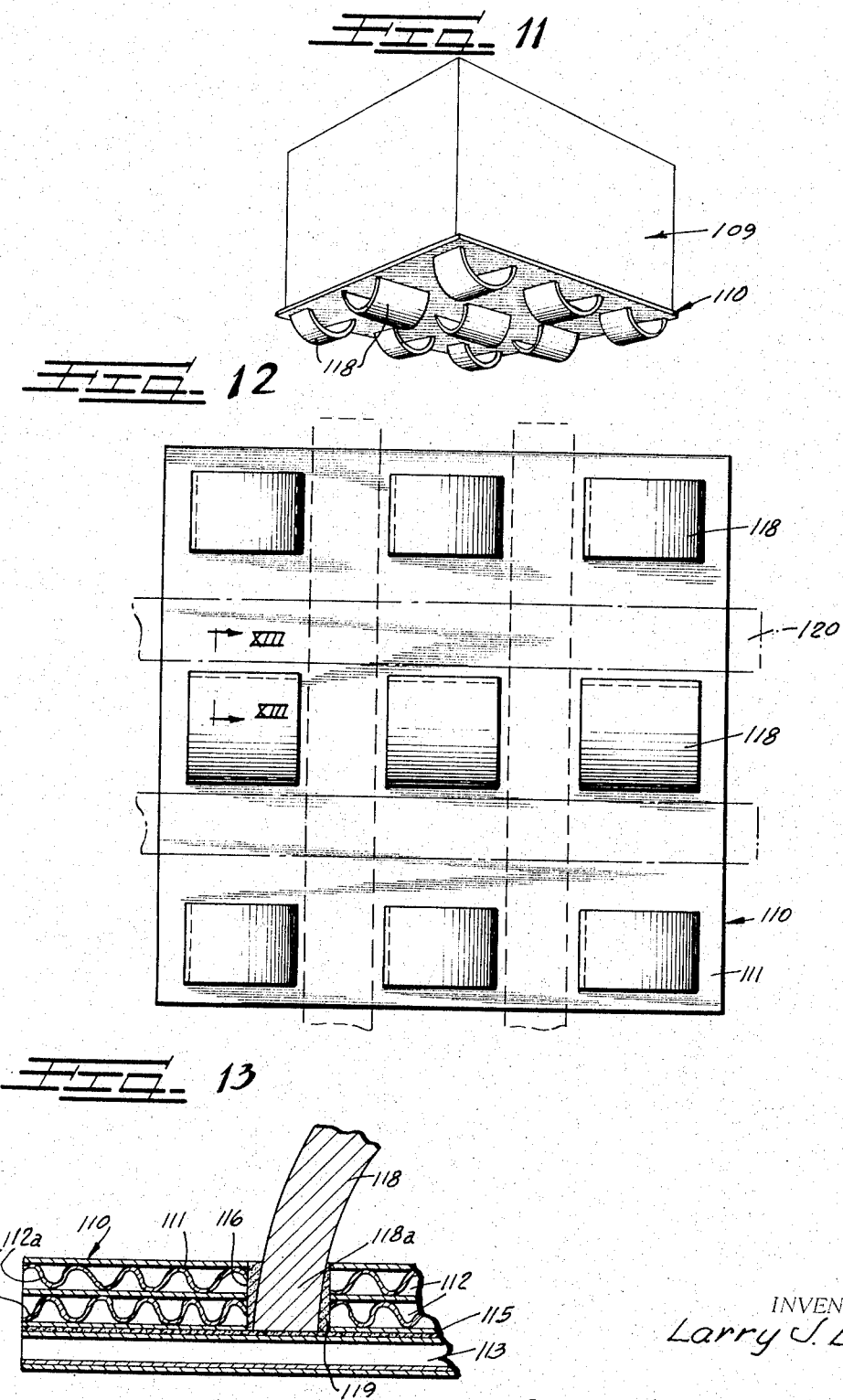
INVENTOR.
Larry J. Budd
BY Hill, Sherman, Meroni, Gross & Simpson ATTORNEYS

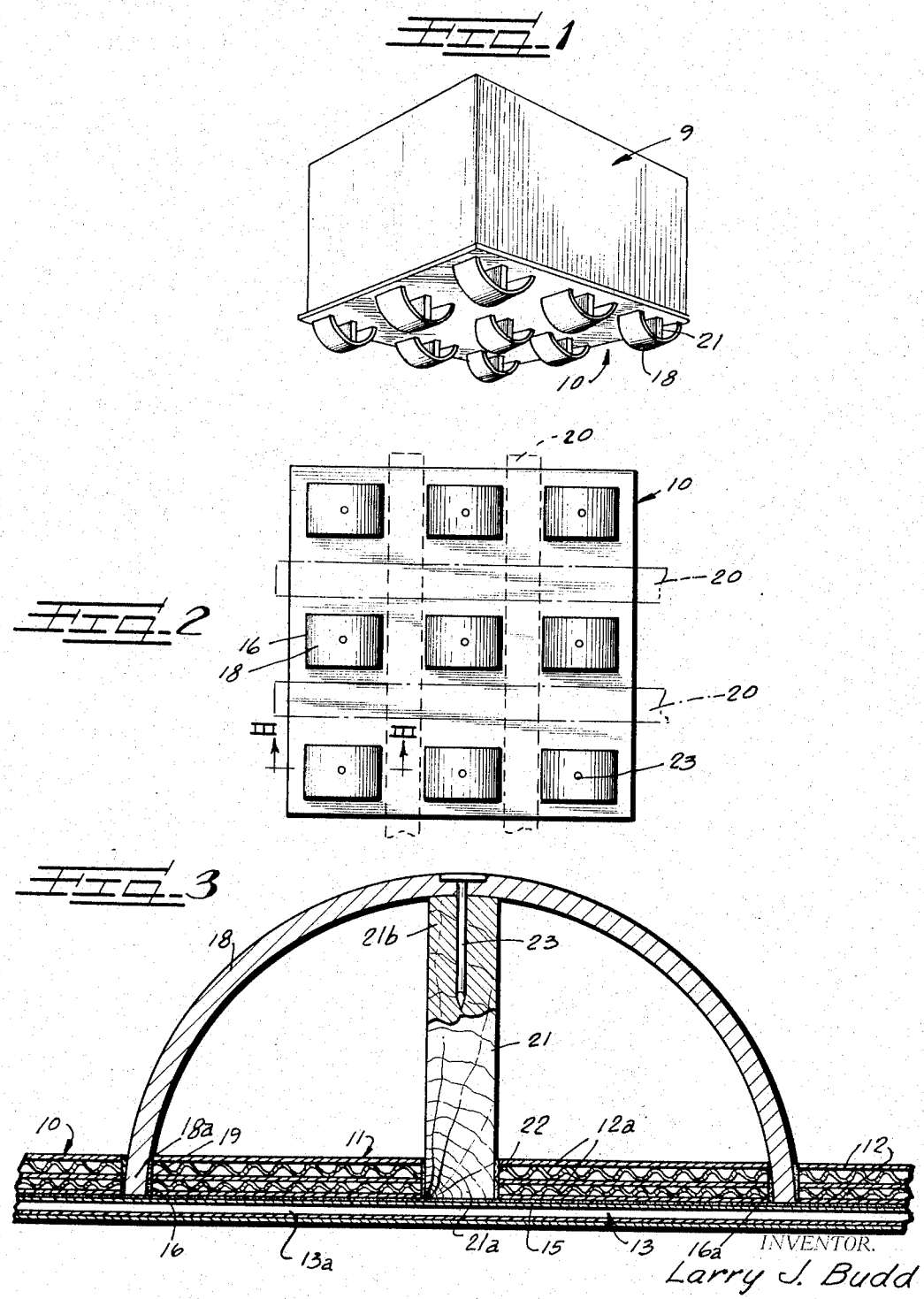

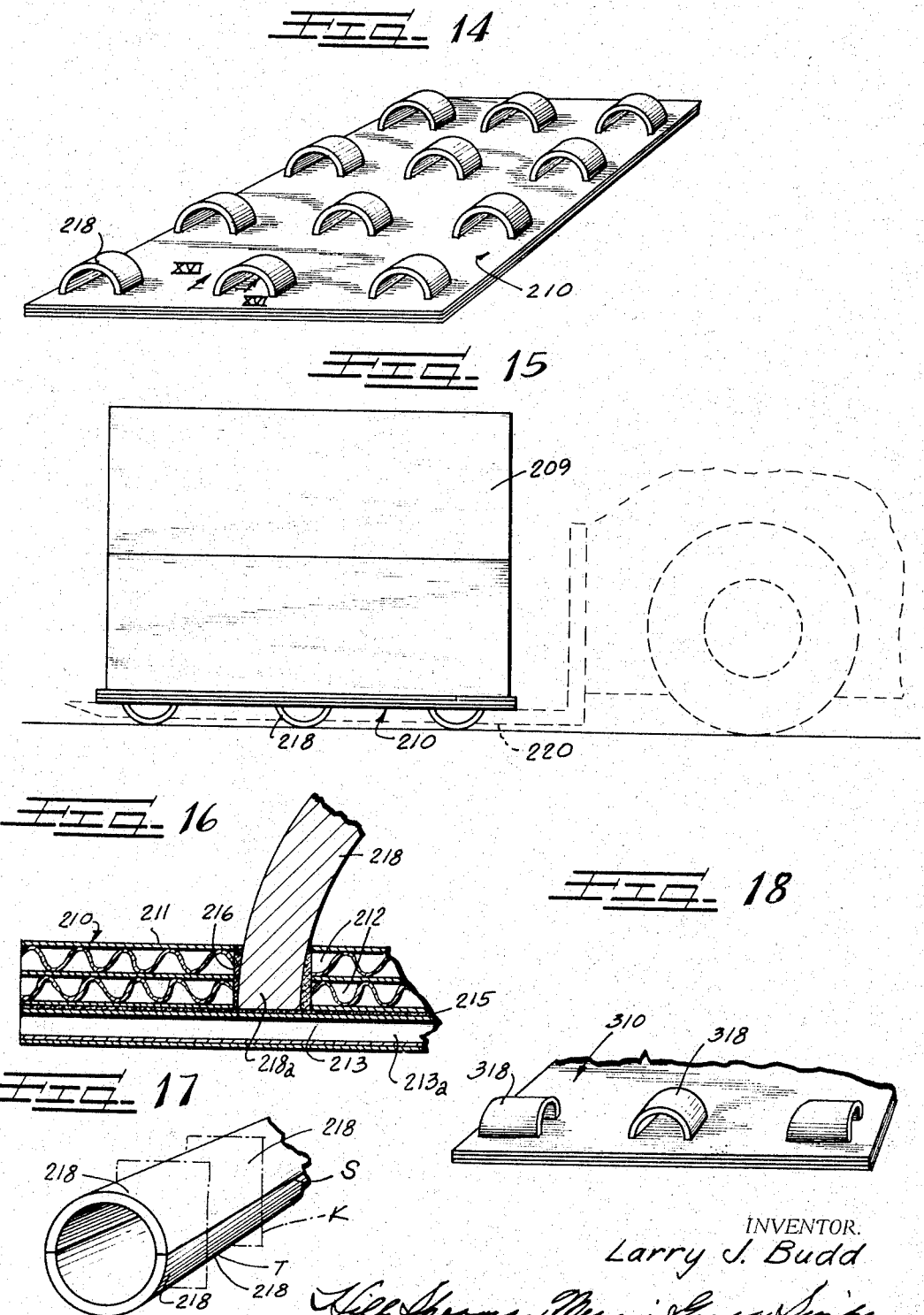

Jan. 2, 1968 L. J. BUDD 3,361,092
DECK PALLET AND METHOD OF MAKING SAME
Filed Oct. 5, 1965 5 Sheets-Sheet 5
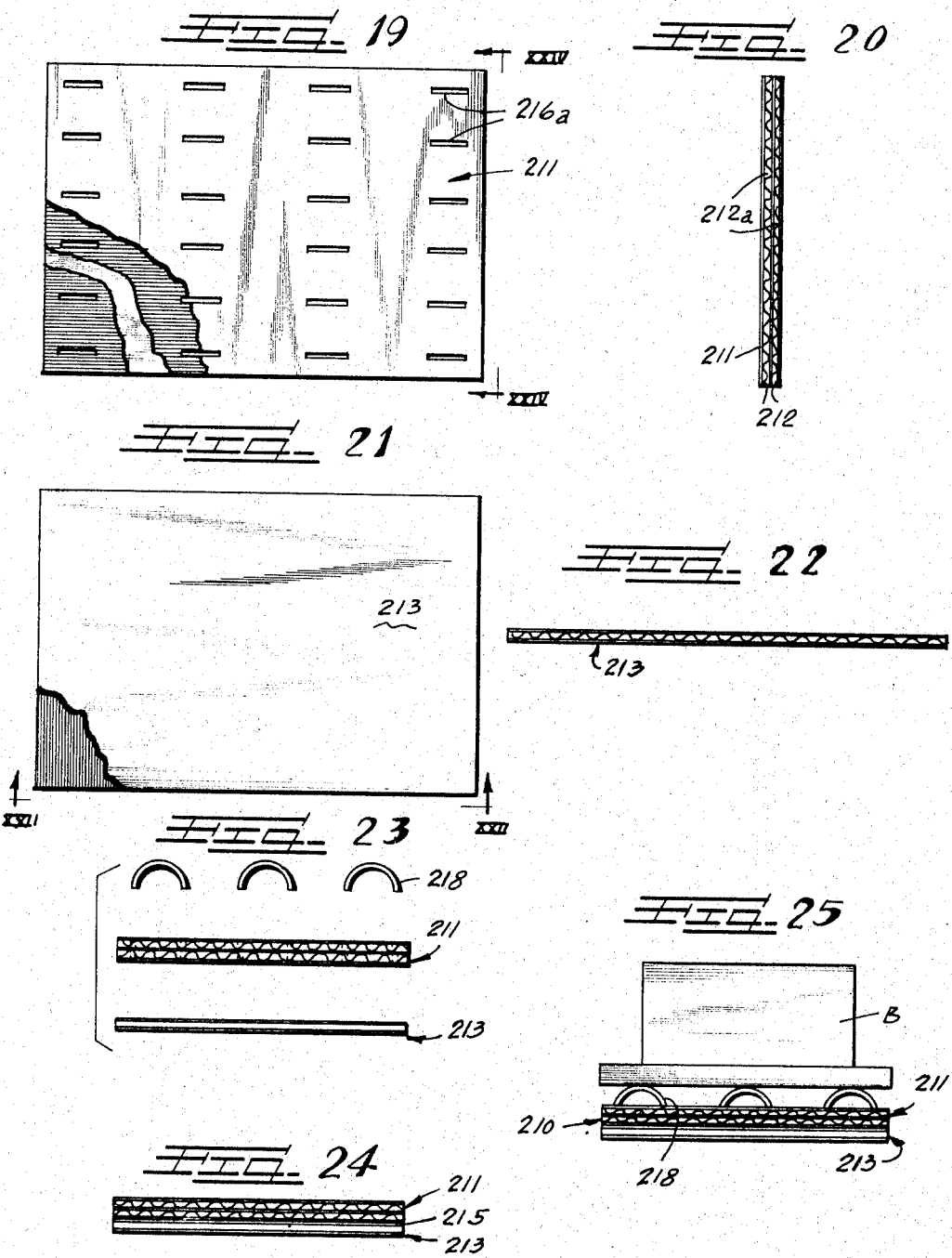
INVENTOR.
Larry J. Budd
BY ATTORNEYS

United States Patent Office 3,361,092
Patented Jan. 2, 1968

3,361,092
DECK PALLET AND METHOD OF MAKING SAME
Larry J. Budd, Elmhurst, Ill., assignor to Pallet Devices, Inc., Des Plaines, Ill., a corporation of Illinois
Filed Oct. 5, 1965, Ser. No. 493,961
24 Claims. (Cl. 108—58)

The present invention relates generally to different types of pallets on which products can be palletized. The pallets herein disclosed are provided with legs which are mounted in various different positions with respect to one another in order to permit two-way or four-way entry of prongs on a lift fork for readily handling the pallets, as desired. The present invention further relates to methods for forming these pallets.

In the past, various different techniques have been used to secure pallet legs to various types of platforms. In the past, one technique employed has been to cut annularly arranged prongs from the platform and use these prongs as attachment means for securing circular rings, as legs, to the platform as disclosed in my U.S. Patents Nos. 2,507,588 and 2,528,413. Another approach to this same type pallet has been to secure parallel sided legs to the platform as disclosed in my Patent No. 2,914,282. From a study of both of these patents, it will be seen that they require round or parallel sided legs.

As a result of the present development, it is no longer necessary to employ annular or round or square legs since half legs and preferably semi-circular or arcuate legs can be used instead, whereby the cost of manufacture can be minimized.

According to my method of manufacture, which embodies important features of this invention, a double-layered sheet of paperboard is formed having corrugations extending in a common direction. A series of rectangular slots are cut into the sheet so that the length of the slots extends at right angles to the corrugations. A second sheet is then mounted and attached with the first double-layer sheet to provide a closure for the slots. A spiral wound paperboard tube is then formed, cut in half, and then cut in equal lengths to form a series of pallet legs of an arcuate or semi-circular shape. The distance between opposite ends of each leg corresponds to the distance between the slots in each pair on the slotted sheet.

Where the pallet is being built to sustain very heavy loads, the multi-ply sheet can be cut with an additional brace slot so that a brace can be mounted therein at one end and secured at an opposite end to an upper side of an associated arcuate leg generally equidistant between opposite ends of the arcuate leg.

The legs can be positioned in different ways on the multi-layered sheets of paperboard to permit two-way or four-way entry of lift forks.

It is, therefore, an important object of this invention to provide a new and improved pallet having half legs mounted thereon.

Still another object of this invention is to provide a new and improved pallet having semi-circular legs provided thereon.

Still another object of this invention is to provide a new and improved pallet having legs positioned for two-way or four-way entry of the prongs on a lift fork.

Still another object of this invention is to provide new and improved methods of forming the pallets herein disclosed.

Yet another object of this invention is to provide a new and improved low cost method of manufacture of pallets.

Still another object of this invention is to provide different types of new pallets which are each capable of sustaining heavy loads and yet which can be manufactured at relatively low cost.

Other objects and features of this invention will more fully become apparent in view of the following detailed description taken in conjunction with the accompanying drawings illustrating several embodiments and in which:

FIGURE 1 is a perspective view of my pallet having a load palletized thereon;

FIGURE 2 is an enlarged bottom view of the pallet shown in FIGURE 1;

FIGURE 3 is an enlarged fragmentary cross-sectional view taken substantially on the line III—III looking in the direction indicated by the arrows as seen in FIGURE 2;

FIGURES 4 and 5 show bottom and end views of a double-ply corrugated sheet illustrating the manner in which the sheet is slotted;

FIGURES 6 and 7 are bottom and end views of a single-ply sheet of paperboard comprising a component of the platform of the pallet;

FIGURE 8 shows the method of securing the brace leg to the platform;

FIGURE 9 is a vertical section similar to FIGURE 8 only illustrating the manner in which the pallet leg is secured to the platform;

FIGURE 10 is a view similar to FIGURE 9 only illustrating the manner by which the pallet leg is attached to the brace leg;

FIGURE 11 is a perspective view of a modified pallet and illustrating a product palletized thereon;

FIGURE 12 is a bottom view of the pallet shown in FIGURE 11 with lift forks illustrated in dotted lines;

FIGURE 13 is an enlarged fragmentary cross-sectional view illustrating the manner of engagement of one of the pallet legs with the platform;

FIGURE 14 is a perspective view of still another modified pallet;

FIGURE 15 is a side view of the pallet shown in FIGURE 14 having a load palletized thereon and illustrating the manner of coaction of a lift truck therewith;

FIGURE 16 is an enlarged fragmentary cross-sectional view taken substantially on the line XVI—XVI looking in the direction indicated by the arrows as seen in FIGURE 14;

FIGURE 17 is a fragmentary perspective view of a spiral wound paper tube with full and dotted lines indicating the manner in which it is cut to form pallet legs in accordance with my method;

FIGURE 18 is a fragmentary perspective view of still another modified pallet;

FIGURES 19 and 20 are plan and end views of a two-ply sheet of paperboard used as a component of the platform shown in FIGURE 14;

FIGURES 21 and 22 are plan and edge views of a single-ply sheet also used as a component of the platform;

FIGURE 23 is an exploded view illustrating the relationship of the platform components with respect to the legs for assembly;

FIGURE 24 is an edge view of the assembled platform components; and

FIGURE 25 illustrates the manner in which the legs are pressed into assembly with the platform.

As shown on the drawings:

The reference numeral 9 indicates generally a structure to be palletized on my deck type pallet 10 which embodies important features of this invention. This pallet has a slotted multi-ply corrugated paperboard sheet 11 with its plies indicated at 12—12 as shown in FIGURE 3, and a second corrugated paperboard sheet 13 is provided. The sheet 11 is formed so that the sheet corrugations 12a and 12a on its plies are disposed in parallel planes. In order to strengthen the pallet the sheet 13 has its corrugations 13a disposed in a plane extended in a direction transverse or generally normal to the direction of the planes of the corrugations 12a and 12a, and such sheets 11 and 13 are secured together by means of a suitable adhesive 15.

Prior to the attachment of the sheets 11 and 13 the multi-ply sheet 11 is die-cut and provided with rows of pairs of spaced rectangular slots 16 and 16a. The length of the slots 16 and 16a extends at right angles to the length of the corrugations 11a and 12a. At the time of the formation of the leg slots 16 and 16a brace slots 17 are also die cut. A series of semi-circular legs 18 are provided having opposite ends 18a—18a, which ends are spaced apart a distance corresponding to the distance between the slots 16 in each pair so that the ends 18a of each leg can be readily inserted into the pairs of slots 16–16a. A suitable adhesive 19 is disposed in the slots so that the legs can be firmly secured with the secured stacked paperboard sheets to complete the construction of the pallet 10. The slots and the legs 18 associated therewith are positioned in such a way so that the legs are longitudinally and transversely spaced for 4-way entry of a lift fork on a lift truck, enabling the pallet to be picked up from any one of its four sides, with the lift fork being indicated generally by the dotted lines indicated at 20 in FIGURE 2. The dotted lines signify the different positions the lift fork legs may occupy depending on the position of the lift truck to the pallet 10.

Prior to the attachment of the pallet legs 18 to the sheets 11 and 13, the braces or brace legs 21 are secured by means of a suitable adhesive or glue 22 in the brace slot 17 at lower ends 21a of the braces. These braces 21 are glued in such a way that they are secured with the sheets 11 and 13 as indicated in FIGURE 3. Thereafter, the legs 18 are positioned over the braces 21 in such a way that opposite ends of the legs 18 as indicated at 18a are engaged and secured in the leg slots 16 as previously described. In order to further rigidify the leg structure, the brace legs 21 are secured at upper ends 21b by means of suitable fasteners 23 to the legs 18 at a mid-point between opposite ends 18a—18a of the semi-circular pallet legs. By joining the braces 21 in the manner described, the load supported on the pallet can be more effectively carried by the pallet legs 18. In other words, the load can be directly transmitted from the sheets 11 and 13 not only through the legs 18 but also through the braces 21 to the points of engagement of the legs 18 with a supporting surface. As previously mentioned, FIGURES 4–10 show the method of manufacturing the pallet illustrated in FIGURES 1–3. Recapitulating briefly, the sheet 11 is initially die-cut to form the slots 16–16a and 17. It will be noted that the sheet 11 is a double ply sheet and that this sheet is then glued to the sheet 13 to provide closures for all of the slots. The brace leg 21 is then secured in position as shown in FIGURE 8 and thereafter the legs 18 are positioned so that the opposite leg ends 18a—18a are secured with the sheets as shown in FIGURE 9. The fastener 23 is then employed to secure the brace leg or brace 21 with the pallet leg 18 as illustrated in FIGURE 10.

Illustrated in FIGURES 11–13 is still another form of my invention wherein a load 109 is palletized on the pallet 110. The pallet 110 is similar to the pallet 10 although the brace legs have been eliminated.

In this instance, the pallet 110 is comprised of a pair of paperboard sheets 111–113 and the sheet 111 is a multiply sheet with the plies indicated at 112–112. These sheets are secured together by a suitable adhesive 115 in much the same manner as previously described.

Prior to the attachment of the sheets, the sheet 111 is die-cut to form the slots 116 for receiving ends 118a of the legs 118. The slots are arranged in rows with the slots in the outside rows being positioned in parallel relation with respect to one another and with the slots disposed in the center row being disposed at right angles to the other slots. Thereafter, the legs 118 are secured in position by means of a suitable adhesive 119 as shown in FIGURE 13.

By mounting the legs in the center at right angles to the legs in the end rows, it has been found that the load supporting characteristics of the pallet 110 can be improved and that this type of pallet can be used in an effective way.

Illustrated in FIGURES 14–17 is still another deck type pallet indicated generally at 210. This pallet has a slotted sheet 211 (FIGURE 16) that has a pair of plies 212—212. Another paperboard sheet 213 is provided and these sheets are secured together by a suitable adhesive is indicated at 215.

Prior to the attachment of the sheets, a spiral wound paperboard tube T (FIGURE 17) is formed. This tube is then cut into tubular segments as indicated at K. The segments are each than further cut or sliced at S to split each segment and to form the semi-circular or arcuate pallet leg 218.

The sheet 211 is then slotted (FIGURE 19) to provide the sheet with pairs of slots 216. The distance between the slots in each pair corresponds to the distance between opposite ends 218a of the pallet leg to be associated therewith. If desired, of course, the paperboard tube T can be split at S and then cut at K to form the legs 218, but the first mentioned method is preferred. It will further be understood that all of the pallet legs disclosed in this application are formed in accordance with the method just described and illustrated in FIGURE 17.

After the slots 216 have been cut (FIGURE 19), the sheets 211 and 213 are secured together (FIGURE 24) as previously described in such a way that the corrugations in the respective sheets are disposed at right angles with respect to one another for maximum strength. The leg ends 218 and slots 216 are then coated with adhesive and assembled together in the manner previously described. These legs can be held in place by a press block B (FIGURE 25) until the adhesive dries.

It will be appreciated that the legs 218 are spaced from one another a sufficient distance to permit the tongs on conventional lift truck 220 to be engaged between the rows of legs 218 for convenient handling of the pallet.

Shown in FIGURE 18 is a modified pallet similar to the pallet 210 only in this instance the end rows of legs 218 have been rotated 90° so that the axis of these legs is disposed at right angles to an axis through the center row of legs 218. It has been found that for certain types of products it is desirable to mount the legs in the manner illustrated in FIGURE 18.

Pallets of the type herein disclosed have been constructed such as a 40″ x 48″ pallet and such pallet has been tested by the placement of a 2,000 pound load thereon and it has been found that the pallet and the legs were not damaged when subjected to this test. This pallet was further tested by dropping 2,000 pounds weight onto the pallet and it was found that the pallet merely bounced when subjected to such load and the pallet was not damaged.

It has been found that satisfactory results can be obtained by providing pallet legs having an 8″ diameter so that when the legs are mounted on the pallet, the deck pallet will be elevated above the ground surface approximately 3¼″. The slots have a depth of about 5/16″.

Although minor modifications might be suggested by those versed in the art, it should be understood that I wish to embody within the scope of the patent warrented hereon, all such modifications as reasonably and properly come within the scope of my contribution to the art.

I claim as my invention:
1. A deck type pallet comprising
 a series of stacked paperboard sheets,
 means securing the sheets together,
 pairs of spaced slots provided on one of the sheets,
 a series of semi-circular legs with each leg having its

3,361,092 opposite ends disposed in an associated pair of the slots, and means securing the leg ends in said slots in unitary assembly with the stacked paperboard sheets.

2. A deck type pallet comprising
a series of stacked paperboard sheets,
means securing the sheets together,
pairs of spaced slots provided on one of the sheets,
a series of semi-circular legs with each leg having its opposite ends disposed in an associated pair of the slots,
the legs being longitudinally and transversely spaced for 4-way entry of a lift fork, and
means securing the leg ends in said slots in unitary assembly with the stacked paperboard sheets.

3. A deck type pallet having
pairs of spaced slots provided on the pallet,
a series of arcuate paperboard legs with each leg having its opposite ends secured in the associated pair of slots, and
means between said opposite ends with said slots securing the leg ends in said slots in unitary assembly with the pallet.

4. A deck type pallet comprising
a series of stacked corrugated paperboard sheets,
means securing the sheets together,
pairs of spaced slots provided on one of the sheets,
a series of paperboard legs with each leg having its opposite ends secured in the associated pair of slots and secured against another of the stacked sheeets,
means securing the leg ends in said slots in unitary assembly with the stacked paperboard sheets, and
one of the sheets having its corrugations extended in a transverse direction relative to the direction of the corrugations in another of said stacked sheets.

5. A method of manufacturing a deck type pallet comprising the steps of
forming a multi-ply corrugated sheet with the corrugations in the plies running in a common direction,
slotting the sheet providing rows of spaced pairs of slots,
superimposing another corrugated sheet on the multi-ply sheet so that the corrugations run in a direction divergent to the direction of the corrugations in the multi-ply sheet and so that the slots are closed at one side,
forming a series of semi-circular spiral wound paperboard legs with the ends of the legs on each leg being spaced a distance corresponding to the distance between the slots in each pair, and
securing the ends of the legs in said slots in unitary assembly.

6. A method of manufacturing a deck type pallet comprising the steps of
forming a multi-ply corrugated sheet with the corrugations in the plies running in a common direction,
slotting the sheet providing rows of spaced pairs of slots,
superimposing another corrugated sheet on the multi-ply sheet so that the corrugations run in a direction divergent to the direction of the corrugations in the multi-ply sheet and so that the slots are closed at one side,
forming a series of semi-circular spiral wound paperboard legs with the ends of the legs on each leg being spaced a distance corresponding to the distance between the slots in each pair, and
securing the ends of the legs in the slots in endwise but engagement with the superimposed sheet.

7. A method of manufacturing a deck type pallet comprising the steps of
forming a multi-ply corrugated sheet with the corrugations in the plies running in a common direction,
slotting the sheet providing rows of spaced pairs of slots and spaced slotted areas between the rows of spaced slots with one of the slotted areas associated with and disposed between each pair of said slots,
superimposing another corrugated sheet on the multi-ply sheet so that the corrugations run in a direction divergent to the direction of the corrugations in the multi-ply sheet,
forming a series of semi-circular spiral wound paperboard legs with the ends of the legs on each leg being spaced a distance corresponding to the distance between the slots in each pair,
forming reinforcing members having a height corresponding to a radius of said legs and securing one end of each of the reinforcing members in the associated slotted area,
securing the ends of the legs in said slots in a unitary assembly with intermediate portions of said legs being supported by said reinforcing members, and
attaching opposite ends of said reinforcing members with the intermediate portions of said legs.

8. A deck type pallet comprising
a series of stacked paperboard sheets including a double thickness sheet,
means securing the sheets together,
the double thickness sheet having pairs of spaced slots therein,
the double thickness sheet having corrugations extended transversely of corrugations in another of said stacked sheets,
a series of semi-circular legs with each leg having its opposite ends disposed in an associated pair of the slots,
the legs being disposed longitudinally and transversely for 4-way entry of a lift fork, and
means securing the leg ends in said slots in unitary assembly with the stacked paperboard sheets.

9. A deck type pallet comprising
a series of stacked paper board sheets,
one of the sheeets having pairs of spaced slots therein with each pair having an intermediate slotted area therebetween,
means securing the sheets together,
a series of semi-circular legs,
reinforcing members each having a height generally corresponding to the radius of the associated semi-circular leg and each having one of its ends secured in one of the slotted areas, and
each of the legs having its opposite ends secured in an associated pair of the slots and having an intermediate leg portion supported by and secured to an associated one of the reinforcing members.

10. A deck type pallet comprising
a series of stacked sheets including a double thickness sheet and a thin sheet,
means securing the sheets together,
the double thickness sheet having pairs of spaced slots therein,
the double thickness sheet having corrugations extended transversely of corrugations in said thin sheet with the thin sheets providing a closure for one end of said slots,
a series of semi-circular legs with each leg having its opposite ends disposed in an associated pair of the slots, and
means securing the leg ends in said slots against said thin sheet in unitary assembly with the stacked sheets.

11. A deck type pallet comprising
pairs of spaced slots in the pallet with each pair having an intermediate slotted area therebetween,
a series of arcuate legs each having its opposite leg ends secured in an associate pair of the slots, and
reinforcing members each having one end secured in one of said slotted areas and an opposite end secured with one of said arcuate legs between said opposite leg ends for supporting the associated legs.

12. A deck type pallet comprising
pairs of spaced leg slots provided on the pallet,
a series of semi-circular paperboard legs with each leg having its opposite ends secured in the associated pair of leg slots, means securing the leg ends in said leg slots in unitary assembly with pallet, a series of brace slots with the brace slots being provided on the pallet and positioned between the leg slots, a series of braces each having one end engaged in an associated brace slot and an opposite end engaged against an inner side of an associate leg, and means securing the brace ends on each brace in the aforesaid engagements.

13. A deck type pallet comprising
a series of layers of paperboard, pairs of spaced leg slots provided in one layer of the pallet, a series of semi-circular paperboard legs with each leg having its opposite ends secured in the associated pair of leg slots in abutment against another layer, means securing the leg ends in said leg slots in unitary assembly with the pallet, a series of brace slots with the brace slots being provided in said one layer and positioned between the leg slots, a series of braces each having one end engaged in an associated brace slot against said another layer and an opposite end engaged against an inner side of an associated leg, and means securing the brace ends on each brace in the aforesaid engagements.

14. A deck type pallet comprising
a series of paperboard layers, pairs of spaced leg slots provided in one of said layers, a series of semi-circular paperboard legs with each leg having its opposite ends secured in the associated pair of leg slots, means securing the leg ends in said leg slots in unitary assembly in abutment against another of said layers, a series of brace slots with the brace slots being in said one layer and positioned between the leg slots, a series of braces each having one end engaged in abutment against said another layer in an associated brace slot and an opposite end engaged against an inner side of an associated leg, means securing the brace ends on each brace in the aforesaid engagements, and said one layer having corrugations extended in a transverse direction relative to the direction of the corrugations in said another layer.

15. A deck type pallet having
pairs of spaced leg slots provided on the pallet,
a brace slot between each pair of leg slots,
a brace having one end secured in said brace slot,
a series of round paperboard legs with each leg having its opposite ends secured in the associated pair of leg slots and with another end of the brace abutted against and secured with an underside of the leg midway between said opposite ends of said legs, and
means securing the leg ends in said leg slots in unitary assembly with the pallet.

16. A deck type pallet having
pairs of spaced leg slots provided on the pallet,
a brace slot between each pair of leg slots,
a brace having one end secured in said brace slot,
a series of paperboard legs with each leg having its opposite ends secured in the associated pair of leg slots and with another end of the brace abutted against and secured with an underside of the leg midway between said opposite ends of said legs, and
means securing the leg ends in said leg slots in unitary assembly with the pallet,
said legs being semi-circular and with each brace having a height corresponding approximately to an inside diameter of said semi-circular leg.

17. A deck type pallet comprising
a series of stacked paperboard sheets,
means securing the sheets together,
pairs of spaced slots provided on one of the sheets,
a series of paperboard legs with each leg having its opposite ends secured in the associated pairs of slots and secured against another of the stacked sheets,
means securing the leg ends in said slots in unitary assembly with the stacked paperboard sheets, and
braces associated with each of said legs each being secured at an underside of said sheets at one end and with said legs midway between opposite ends of said legs at opposite ends of said braces,
the braces being disposed in normal relation to said sheets.

18. A method of manufacturing a deck type pallet comprising the steps of
forming a corrugated paperboard sheet,
slotting the sheet providing rows of spaced pairs of slots,
superimposing another corrugated sheet on the slotted sheet closing the slots at one end,
forming a series of legs with the ends of the legs on each leg being spaced a distance corresponding to the distance between the slots in each pair, and
securing the ends of the legs in said slots in unitary assembly.

19. A deck type pallet comprising
a series of layers of corrugated paperboard,
pairs of spaced rectangular leg slots provided in one layer of the pallet with the length of the slots being at right angles to the length of the corrugations in the associated layer,
a series of semi-circular paperboard legs with each leg having its opposite ends secured in the associated pair of leg slots in abutment against another layer, and
means securing the leg ends in said leg slots in unitary assembly with the pallet.

20. A deck type pallet comprising
a series of stacked paperboard sheets including a double thickness sheet having corrugations extended in a common direction,
means securing the sheets together,
the double thickness sheet having pairs of spaced rectangular slots therein with the length of the slots at right angles to said corrugations in the double thickness sheet,
the double thickness sheet having its corrugation extended transversely of corrugations in another of said stacked sheets,
a series of semi-circular legs with each leg having its opposite ends disposed in an associated pair of the slots, and
means securing the leg ends in said slots in unitary assembly with the stacked paperboard sheets.

21. A method of manufacuring a deck type pallet comprising the steps of
forming a sheet,
slotting the sheet providing rows of spaced pairs of slots,
superimposing another sheet on the slotted sheet closing each of the slots at one end,
forming a semi-circular spiral wound paperboard tube,
cutting the tube in half and into lengths forming a series of semi-circular spiral wound paperboard legs with the ends of the legs on each leg being spaced a distance corresponding to the distance between the slots in each pair, and
securing the ends of the legs in said slots in unitary assembly.

22. A method of manufacturing a deck type pallet comprising the steps of
forming a paperboard tube,
cutting the tube into a series of tubular segments having a length corresponding to the length of the desired leg, splitting each segment forming a series of arcuate legs, forming a sheet, slotting the sheet providing rows of spaced pairs of slots the distance between the slots in each pair corresponding to the diameter of the semi-circular legs, superimposing another sheet on the slotted sheet closing each of the slots at one end, and securing the ends of the legs in said slots in unitary assembly.

23. A method of manufacturing a deck type pallet comprising the steps of forming a paperboard tube, cutting the tube into a series of tubular segments having a length corresponding to the length of the desired leg, splitting each segment forming a series of arcuate legs, forming a sheet, slotting the sheet providing rows of spaced pairs of slots the distance between the slots in each pair corresponding to the diameter of the semi-circular legs and with slots in one row being at right angles to the slots in an adjacent row, superimposing another sheet on the slotted sheet closing each of the slots at one end, and securing the ends of the legs in said slots in unitary assembly whereby the axes of the legs in one row is at right angles to the axes of the legs in an adjacent row.

24. A pallet comprising pairs of spaced slots provided on the pallet with the slots being arranged in rows and with the axes of the slots in one row being at right angles to the axes of the slots in an adjacent row, a series of semi-circular legs with each leg having its opposite end secured in the associated pair of slots and secured therein, and means securing the leg ends in said slots in unitary assembly with the pallet.

References Cited

UNITED STATES PATENTS

| | | | |
|---|---|---|---|
| 2,506,345 | 5/1950 | Crawford | 108—51 |
| 2,507,588 | 5/1950 | Brandon et al. | 108—7 |
| 2,519,839 | 8/1950 | Leisen | 108—58 |
| 2,691,500 | 10/1954 | Baumann | 108—56 |
| 2,738,153 | 3/1956 | Frase | 108—58 |
| 2,914,282 | 11/1959 | Budd | 108—56 |
| 2,955,791 | 10/1960 | George | 108—56 |
| 3,013,922 | 12/1961 | Fisher | 264—45 |
| 3,036,802 | 5/1962 | Kitchell | 108—56 |
| 3,055,624 | 9/1962 | Wilson | 108—58 |
| 3,092,046 | 6/1963 | Davidson | 108—56 |
| 3,099,969 | 8/1963 | Davidson | 108—56 |
| 3,124,627 | 3/1964 | Hood | 264—54 |
| 3,152,199 | 10/1964 | Roberts | 264—45 |
| 3,177,271 | 4/1965 | Slayman | 264—45 |
| 3,187,689 | 6/1965 | Hess | 108—58 |

BOBBY R. GAY, *Primary Examiner.*

FRANK B. SHERRY, *Examiner.*

G. O. FINCH, *Assistant Examiner.*